(12) United States Patent
Sheil et al.

(10) Patent No.: US 11,022,041 B2
(45) Date of Patent: Jun. 1, 2021

(54) SENSOR SNUBBER BLOCK FOR A GAS TURBINE ENGINE

(71) Applicant: UNITED TECHNOLOGIES CORPORATION, Farmington, CT (US)

(72) Inventors: Robert F. Sheil, Hartford, CT (US); Michael Luther Comeau, Glastonbury, CT (US); Joo Sub Rhee, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 772 days.

(21) Appl. No.: 15/289,496

(22) Filed: Oct. 10, 2016

(65) Prior Publication Data
US 2017/0101934 A1    Apr. 13, 2017

Related U.S. Application Data

(60) Provisional application No. 62/240,616, filed on Oct. 13, 2015.

(51) Int. Cl.
*F02C 7/22* (2006.01)
*F02C 7/232* (2006.01)

(52) U.S. Cl.
CPC .......... *F02C 7/222* (2013.01); *F02C 7/232* (2013.01); *F05D 2220/32* (2013.01); *F05D 2300/121* (2013.01)

(58) Field of Classification Search
CPC .. F02C 7/222; F02C 7/232; F02C 9/26; F02C 9/28; F23R 2900/00013; F23R 2900/00014; F23R 3/60; F05D 2270/301; F05D 2270/3011; F05D 2270/3013; F05D 2270/3015

USPC ......................................................... 137/557
See application file for complete search history.

(56) References Cited

U.S. PATENT DOCUMENTS

| 4,672,728 A | * | 6/1987 | Nimberger | F16L 23/00 |
| | | | | 29/890.142 |
| 4,761,957 A | | 8/1988 | Eberhardt et al. | |
| 4,920,626 A | * | 5/1990 | Nimberger | F16L 41/008 |
| | | | | 29/282 |
| RE34,610 E | * | 5/1994 | Miller | G01F 1/36 |
| | | | | 137/270 |

(Continued)

FOREIGN PATENT DOCUMENTS

| EP | 0428373 A2 | 5/1991 |
| EP | 0953749 A2 | 11/1999 |

(Continued)

OTHER PUBLICATIONS

European Extended Search Report dated Feb. 21, 2017, issued in the corresponding European Patent Application No. 16193544.0.

(Continued)

*Primary Examiner* — Todd E Manahan
*Assistant Examiner* — Thuyhang N Nguyen
(74) *Attorney, Agent, or Firm* — Bachman & LaPointe, P.C.

(57) ABSTRACT

A snubber block for a manifold assembly of a gas turbine engine includes a body with at least one passage with a respective flow restrictive orifice, the body operable to receive a sensor and a male section that extends from the body, the male section receivable within a fuel manifold.

17 Claims, 7 Drawing Sheets

(56) References Cited

U.S. PATENT DOCUMENTS

| | | |
|---|---|---|
| 5,795,998 A | 8/1998 | Smith |
| 5,895,844 A | 4/1999 | Krueger |
| 5,987,975 A | 11/1999 | Rafei |
| 6,094,904 A | 8/2000 | Goodrich et al. |
| 6,311,553 B1 | 11/2001 | Schöffel et al. |
| 6,429,020 B1 | 8/2002 | Thornton et al. |
| 6,672,145 B2 | 1/2004 | Mitchell et al. |
| 6,895,758 B2* | 5/2005 | Knight ............... F23R 3/28 60/39.281 |
| 6,996,970 B2* | 2/2006 | Lorenz ............... F02C 9/30 60/39.281 |
| 7,003,939 B1 | 2/2006 | Rackwitz et al. |
| 7,472,586 B2 | 1/2009 | Niimi et al. |
| 7,637,096 B2 | 12/2009 | Razzell et al. |
| 7,784,487 B2 | 8/2010 | Arnett |
| 8,572,985 B2 | 11/2013 | Waddleton |
| 8,863,580 B2* | 10/2014 | Hausler ............... G01L 19/0636 210/449 |
| 9,133,772 B2 | 9/2015 | Heitz |
| 2005/0284149 A1 | 12/2005 | Jansen et al. |
| 2007/0130911 A1 | 6/2007 | Goldberg et al. |
| 2009/0114295 A1* | 5/2009 | Milburn ............... F16K 27/003 137/597 |

FOREIGN PATENT DOCUMENTS

| | | |
|---|---|---|
| EP | 2031230 A2 | 3/2009 |
| EP | 2187023 A1 | 5/2010 |

OTHER PUBLICATIONS

European Office action dated Sep. 21, 2018 issued in the corresponding European Patent Application No. 16193544.0.

Wika, et al: "Pressure Gauge Snubbers", Jan. 1, 2008 (Jan. 1, 2008), XP055507281, Retrieved from the Internet: URL:https://www.us/upload/DS_ACC-910-12-100_en_us_16736.pdf.

\* cited by examiner

SENSOR SNUBBER BLOCK FOR A GAS TURBINE ENGINE

BACKGROUND

The present disclosure relates to a sensor for a gas turbine engine and, more particularly, to a snubber block to minimize pump pulsations to the sensor.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

A fuel supply system for a gas turbine often includes multiple fuel supply manifolds that deliver fuel to multiple areas of the gas turbine engine. The main fuel manifold includes a fuel filter. The pressure differential between fuel going into the filter and fuel coming out is measured by the Fuel Filter Delta Pressure Sensor (FFDP).

As the FFDP sensor is mounted to the fuel manifold, the FFDP sensor may be subject to fuel pump pressure pulsations through the internal passages of the fuel manifold. These pulsations generate a throbbing effect on the sensor's diaphragm that, over time, may result in failure.

SUMMARY

A snubber block according to one disclosed non-limiting embodiment of the present disclosure can include a body with at least one passage with a respective flow restrictive orifice, the body operable to receive a sensor.

A further embodiment of the present disclosure may include a male section that extends from the body, the male section receivable within a manifold.

A further embodiment of any of the embodiments of the present disclosure may include, wherein a radial seal mounted to the male section.

A further embodiment of any of the embodiments of the present disclosure may include, wherein a pinch seal mounted around the male section.

A further embodiment of any of the embodiments of the present disclosure may include, wherein the male section is geometrically equivalent to a male section of a sensor that is receivable within the body.

A further embodiment of any of the embodiments of the present disclosure may include, wherein the body defines a first and a second fastener aperture to mount the body to a fuel manifold.

A further embodiment of any of the embodiments of the present disclosure may include, wherein the first and the second fastener aperture are geometrically arranged to be equivalent to a first and a second fastener aperture in the body to mount the sensor to the body.

A manifold assembly for a gas turbine engine, according to another disclosed non-limiting embodiment of the present disclosure can include a fuel manifold; a snubber block mounted to the fuel manifold; and a sensor mounted to the snubber block.

A further embodiment of any of the embodiments of the present disclosure may include, wherein the sensor is a Fuel Filter Delta Pressure Sensor.

A further embodiment of any of the embodiments of the present disclosure may include, wherein at least one passage with a respective flow restrictive orifices.

A further embodiment of any of the embodiments of the present disclosure may include, wherein the at least one passage is in communication with a fuel filter.

A further embodiment of any of the embodiments of the present disclosure may include, wherein the fuel filter is mounted to the fuel manifold.

A further embodiment of any of the embodiments of the present disclosure may include, wherein a first and a second flow passage with a respective flow restrictive orifice in each of the first and second passage, the first and second passage in communication with a fuel filter.

A further embodiment of any of the embodiments of the present disclosure may include, wherein a first and a second fastener aperture to mount the snubber block to the fuel manifold is geometrically equivalent to a first and a second fastener aperture to mount the sensor to the snubber block.

A further embodiment of any of the embodiments of the present disclosure may include, wherein an interface to mount the snubber block to the fuel manifold is geometrically equivalent to an interface to mount the sensor to the snubber block.

A further embodiment of any of the embodiments of the present disclosure may include, wherein the snubber block is manufactured of aluminum.

A method of assembling a sensor to a gas turbine engine according to another disclosed non-limiting embodiment of the present disclosure can include mounting a snubber block between a component of the gas turbine engine and a sensor.

A further embodiment of any of the embodiments of the present disclosure may include, wherein the snubber block restricts a fuel flow to and from the sensor.

A further embodiment of any of the embodiments of the present disclosure may include, wherein the snubber block restricts a fuel flow to and from the sensor and a fuel filter.

A further embodiment of any of the embodiments of the present disclosure may include, wherein an interface between the snubber block and the component of the gas turbine engine is geometrically equivalent is geometrically equivalent to an interface between the snubber block and the sensor, the component of the gas turbine engine including a fuel manifold.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
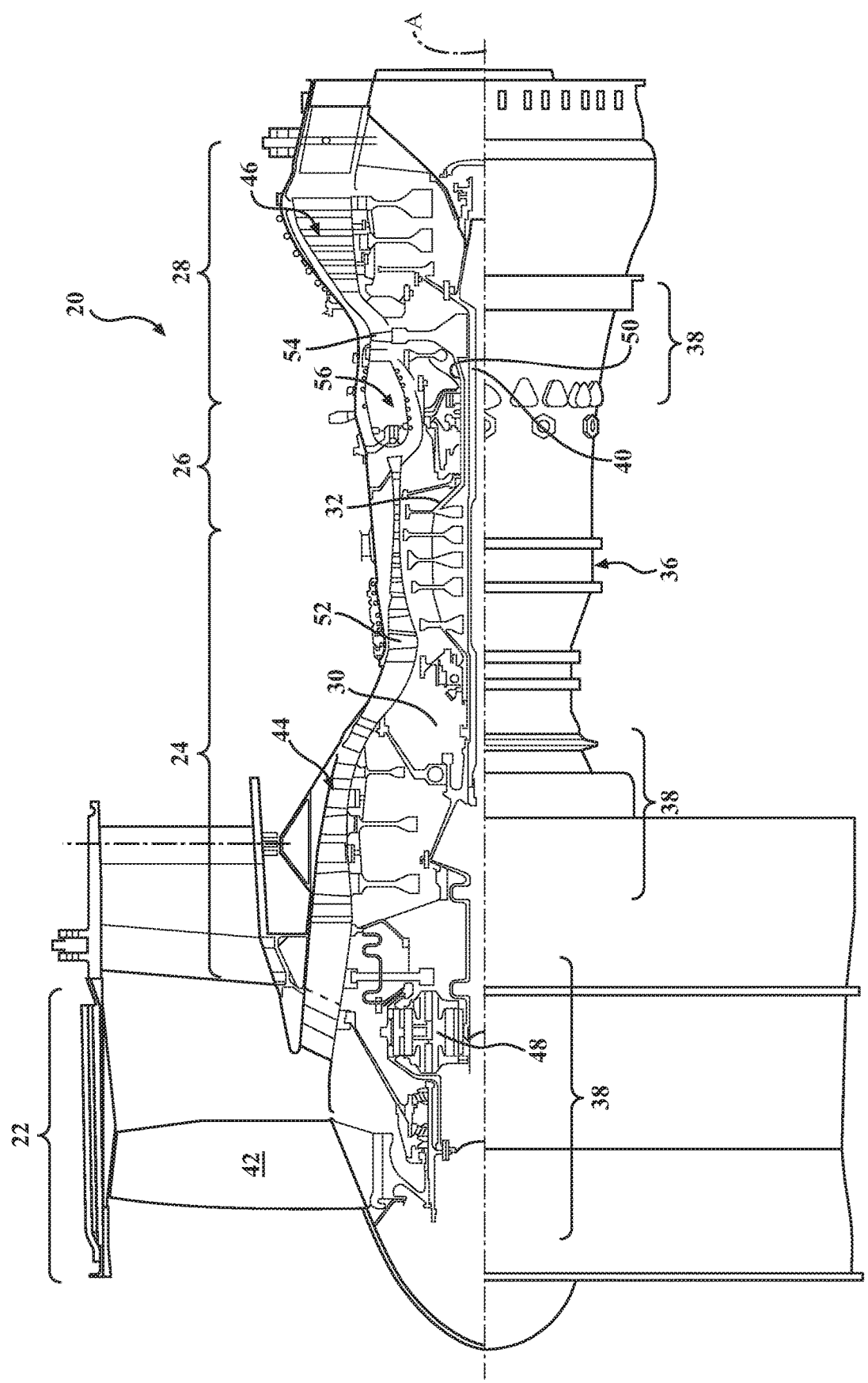
FIG. 1 is a schematic cross-section of an example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section among other systems or features. The fan section 22 drives air into the compressor section 24 and along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, for example, but not limited to, a three-spool (plus fan) engine.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded through the HPT 54 and LPT 46. The LPT 46 and HPT 54 rotationally drive the respective low spool 30 and high spool 32 in response to the expansion.

Figure 2:
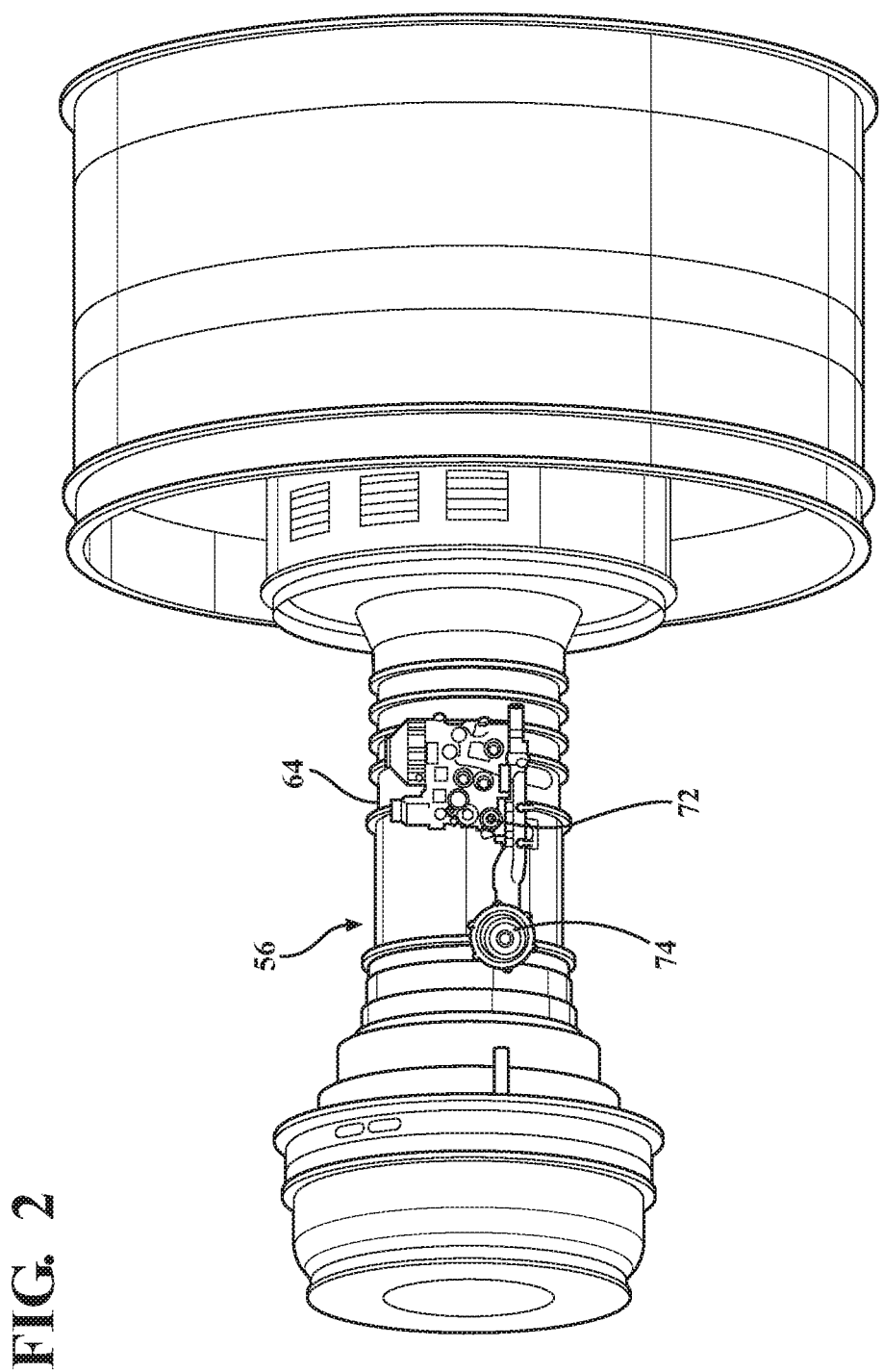
FIG. 2 is a perspective view of an example fuel supply manifold assembly.

With reference to FIG. 2, a manifold assembly 60 generally includes at least one fuel manifold 62, which may be a cast component such as that mounted to a diffuser case module 64 of the combustor 56. This cast manifold is an externally mounted manifold, which may be located according to externals architecture and packaging requirements. It should be appreciated that various other structures, such as Thermal Management Systems, Fuel Oil System manifolds and other fluid transport devices will benefit herefrom.

Figure 3:
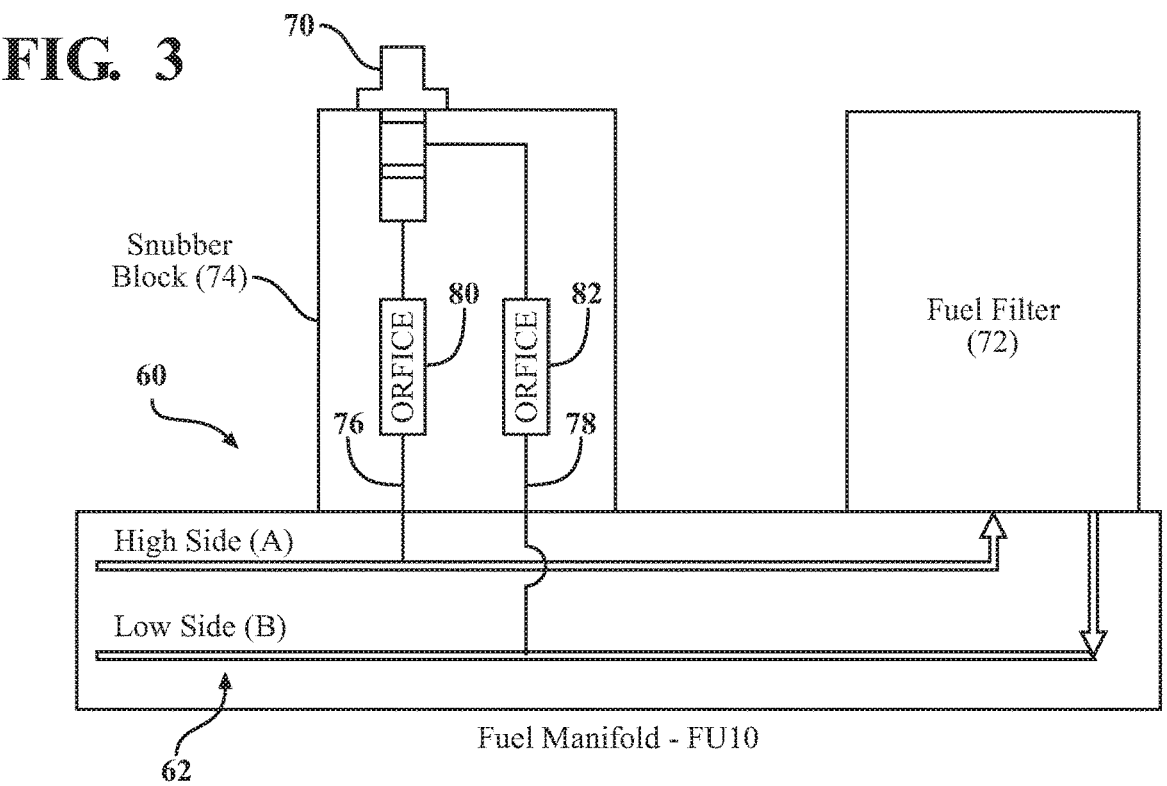
FIG. 3 is a schematic block view of a fuel supply manifold assembly with a snubber block according to one disclosed non-limiting embodiment.
Figure 4:
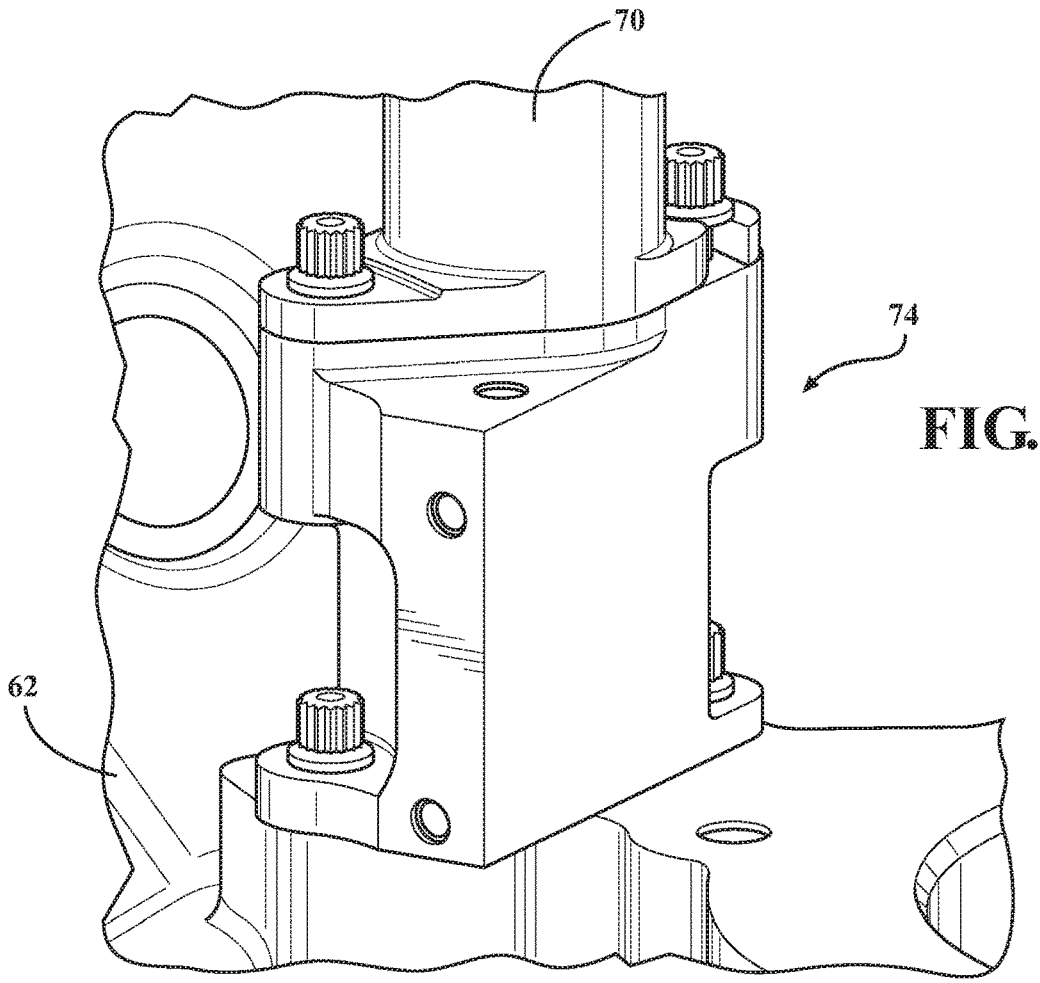
FIG. 4 is a perspective view of the snubber block.

With reference to FIG. 3, the fuel manifold 62 may include a Fuel Filter Delta Pressure Sensor (FFDP Sensor) 70 that senses fuel flow through a fuel filter 72. The FFDP sensor 70 in the depicted embodiment is mounted to the fuel manifold 62 via a snubber block 74 (also shown in FIGS. 4, 5, 6A-6D, and 7). The FFDP sensor 70 is mounted to the snubber block 74 to minimize pressure pulsations communicated to the FFDP sensor 70.

The snubber block 74 contains passages 76, 78 with respective flow restrictive orifices 80, 82 installed therein to reduce pump pulse sensations that may otherwise cause sensor failure. It should be appreciated that various flow restrictive orifices 80, 82 may be utilized depending upon, for example only, the source of the pulsations and the sensor. The passages 76, 78 (FIG. 5) may be cross-drilled or otherwise formed such as via additive manufacturing. The flow restrictive orifices 80, 82 dampen the effects of the pulsations on the FFDP Sensor 70 as the flow restrictive orifices 80, 82 restrict the respective high side and low side of the pressure gradient.

Figure 5:
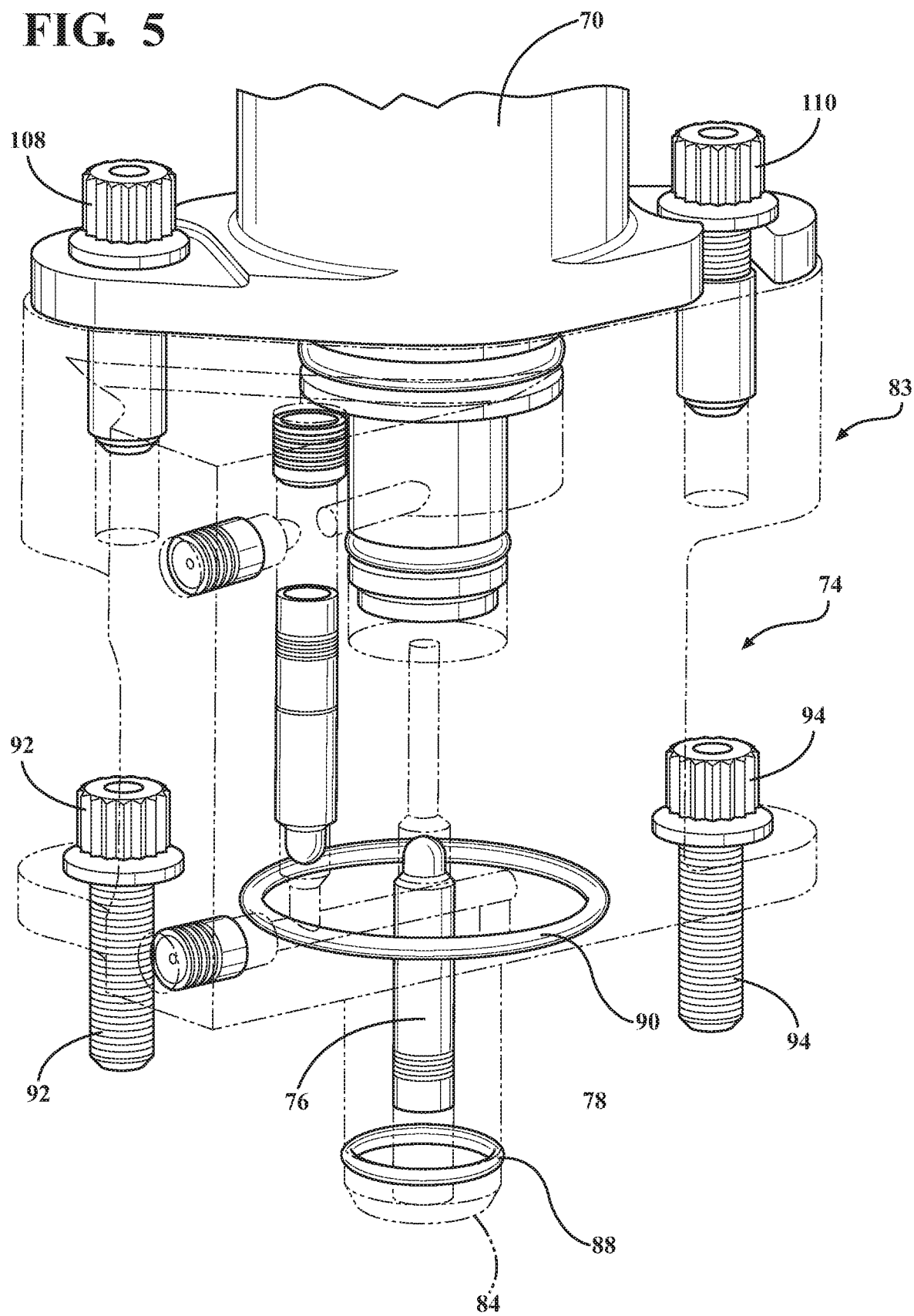
FIG. 5 is a partial phantom view of the snubber block.
Figure 6A:
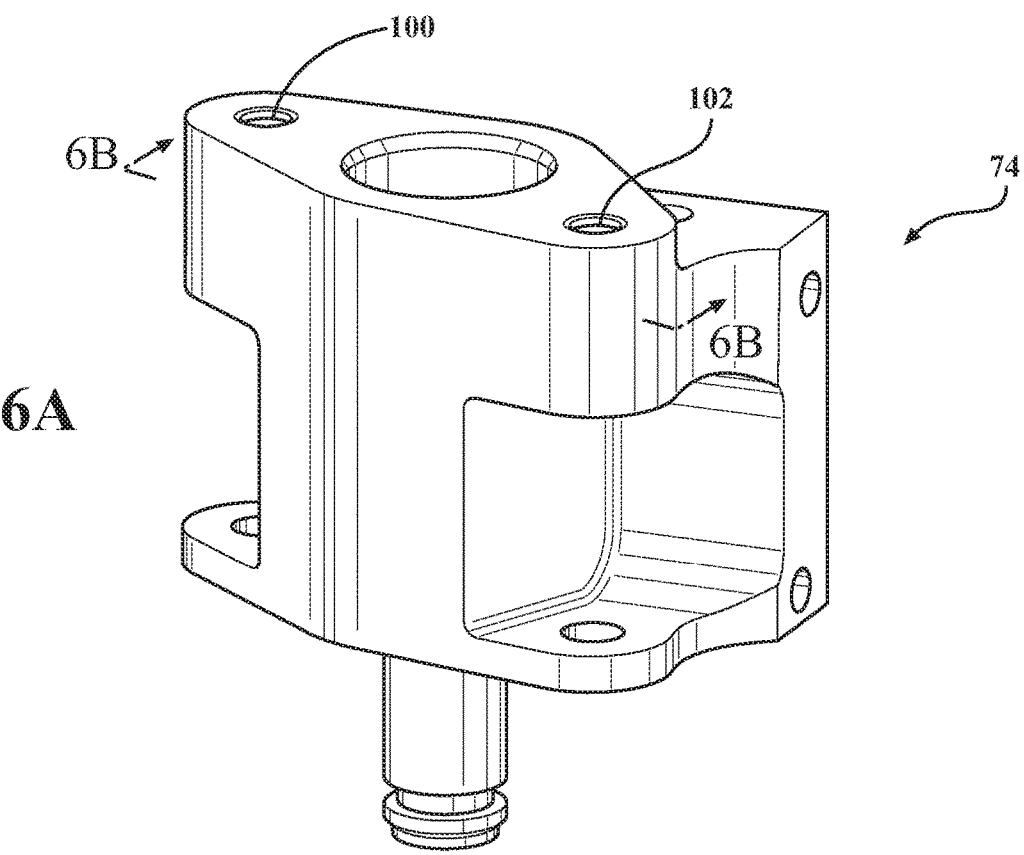
FIG. 6A is a perspective view of the snubber block.
Figure 6B:
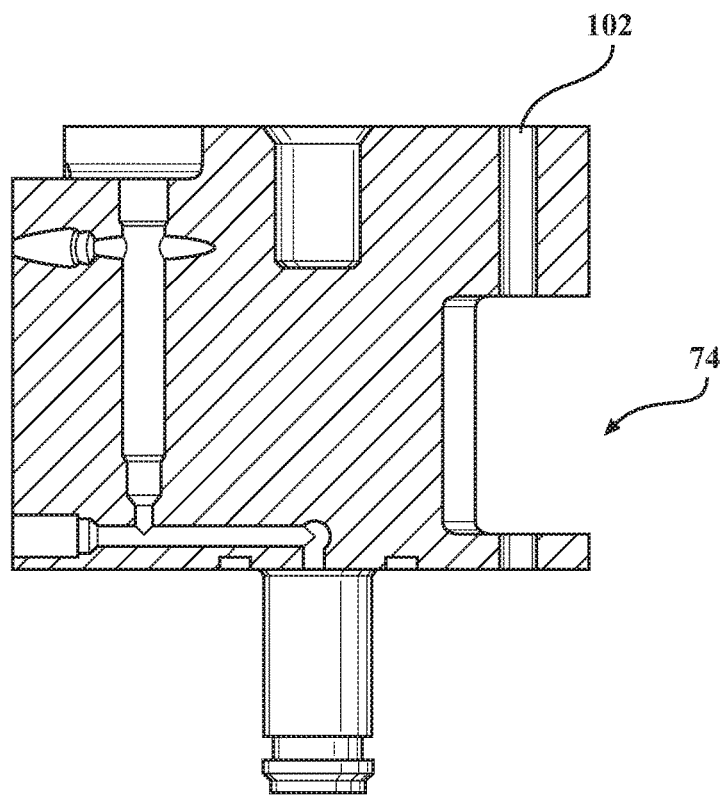
FIG. 6B is a sectional view of the snubber block.
Figure 6C:
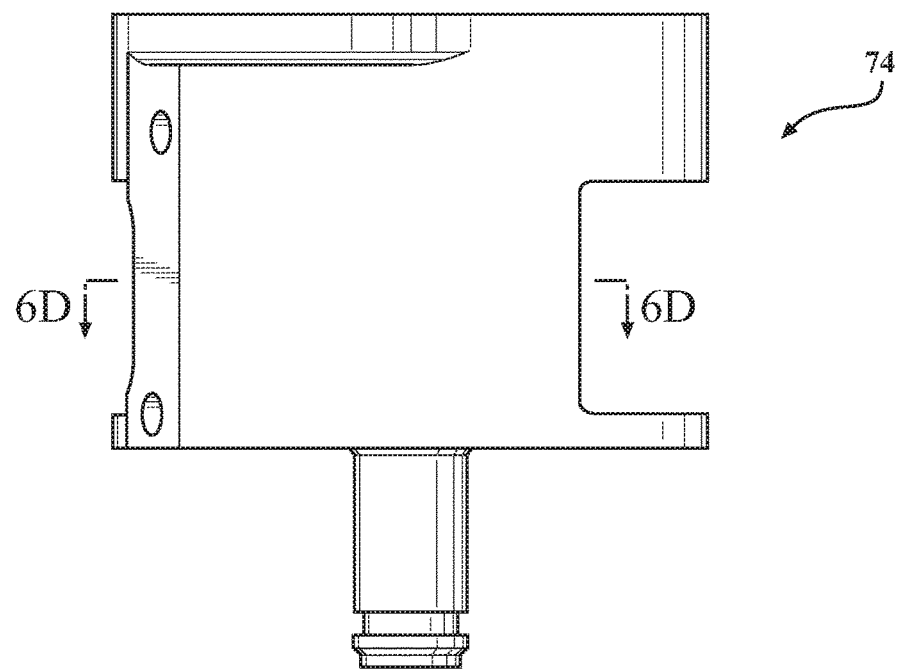
FIG. 6C is a perspective view of the snubber block.
Figure 6D:
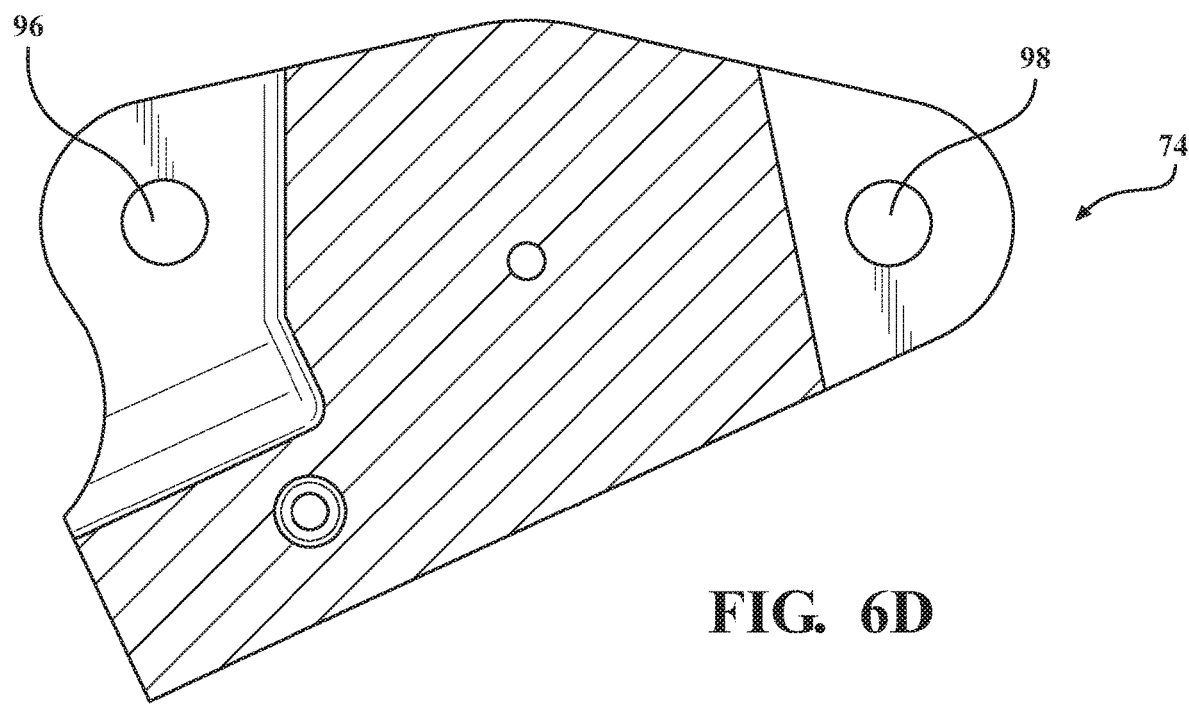
FIG. 6D is a sectional view of the snubber block transverse to the sectional view of FIG. 6B.
Figure 7:
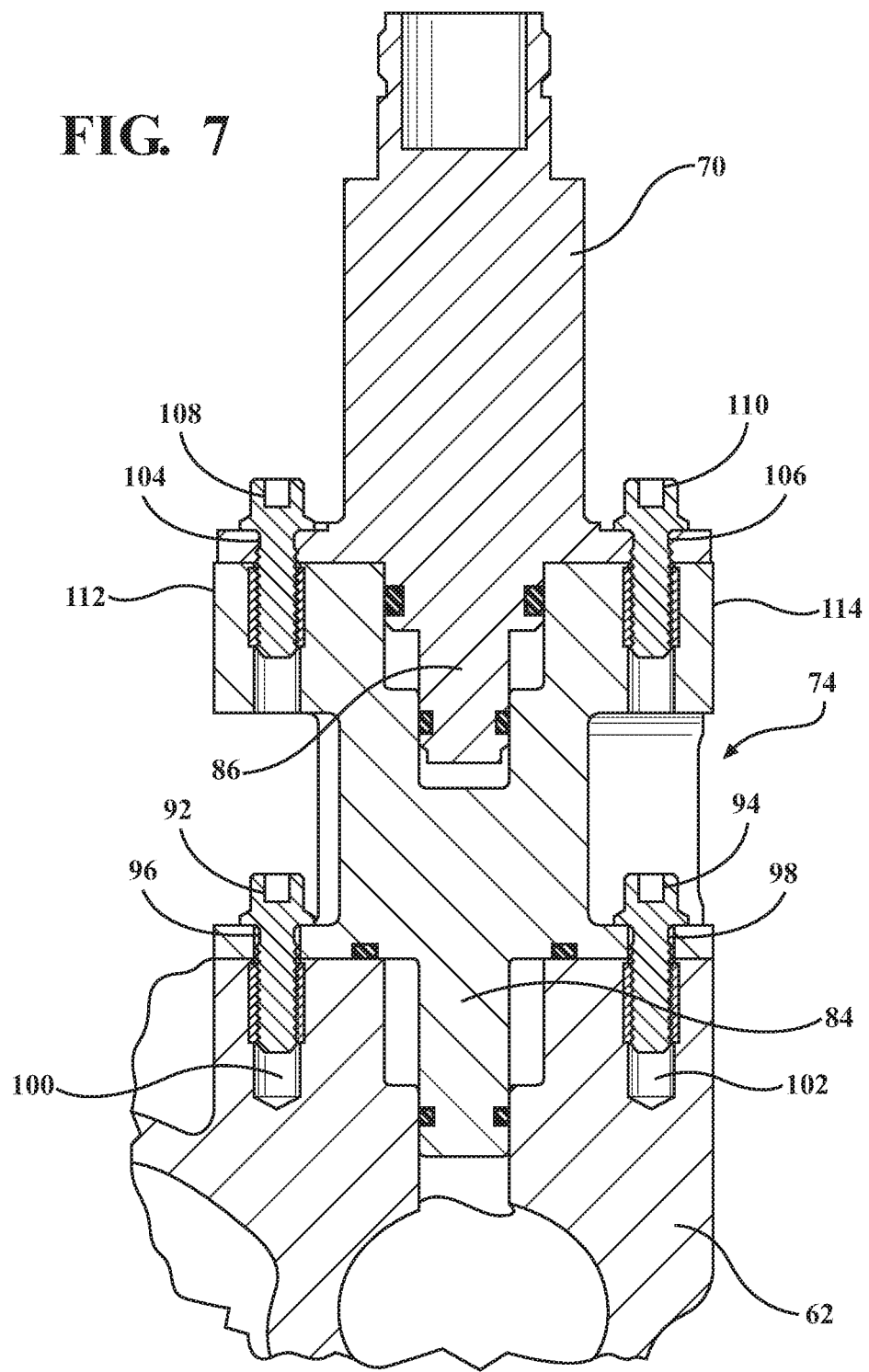
FIG. 7 is a sectional view of the snubber block installed in the manifold assembly.

With reference to FIG. 5, in one embodiment, the snubber block 74 is manufactured of aluminum or stainless steel. The snubber block 74 includes a body 83 from which extends a male section 84 that is shaped similar to a male end 86 of the sensor 70 such that the snubber block 74 installs into the fuel manifold 62 without modification thereto (FIG. 7). That is, in the disclosed embodiment, the interface between the snubber block 74 and the fuel manifold 62 is geometrically equivalent to the interface between the sensor 70 and the snubber block 74 such that a direct installation of the snubber block 74 is provided without modification to the fuel manifold 62.

Various seals such as O-rings may be utilized to facilitate a seal of the fluid flow. In one embodiment, a radial seal 88 is located on the male section 84 of the snubber block 74 and an axial pinch seal 90 is mounted around the male section to seal with the surface of the fuel manifold 62 when the snubber block 74 is fastened to the fuel manifold via bolts 92, 94.

A first and second aperture 96, 98 are arranged in the body 83 for respective bolts 92, 94 that are threaded into threaded apertures 100, 102 formed in the manifold 62 are geometrically arranged as are a first and second aperture 104, 106 in the sensor 70 for respective bolts 108, 110 that are threaded into threaded apertures 112, 114 formed in the snubber block 74. That is, the apertures are geometrically arranged such that the snubber block 74 is readily installed with minimal modification to either the sensor 70 or the manifold 62. For example the fuel manifold 62 may require only a more refined localized surface finish to facilitate an effective seal with the axial pinch seal 90.

The snubber block 74 thereby reduces fuel pump pulse sensations to increase the service life of the sensor 70.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A snubber block comprising:
   a snubber block body with fuel passages with respective flow restrictive orifices, the snubber block body operable to receive a sensor;
   a male section that extends from the snubber block body along an axis, an outer surface of a lower flange of the snubber block body directly contacts an outer surface of a fuel manifold, and an upper flange of the snubber block body directly contacts a sensor flange of the sensor, the male section of the snubber block received within the fuel manifold to which the sensor is otherwise received;
   the sensor mounted to the snubber block along the axis, the lower flange of the snubber block body comprising a first and second aperture for a first set of bolts that are threaded into threaded apertures formed in the fuel manifold, the first and second aperture of the lower flange geometrically arranged with respect to a first and second aperture formed in the sensor flange for a second set of bolts that are threaded into threaded apertures formed in the upper flange of the snubber block; and
   the sensor comprising a male section geometrically equivalent in shape to the male section of the snubber block, the male section of the sensor received at the upper flange within the snubber block body along the axis such that the flow restrictive orifices dampen pump pulse sensation to the sensor as the flow restrictive orifices restrict a respective high side and low side of a pressure gradient in a fuel flow.

2. The snubber block as recited in claim 1, further comprising a radial seal mounted to the male section.

3. The snubber block as recited in claim 2, further comprising a pinch seal mounted around the male section.

4. A manifold assembly for a gas turbine engine, comprising:
   a fuel manifold;
   a sensor;
   a snubber block comprising a male section that extends from a snubber block body along an axis, an outer surface of a lower flange of the snubber block body directly contacts an outer surface of the fuel manifold, and an upper flange of the snubber block body directly contacts a sensor flange of the sensor, the male section of the snubber block received within the fuel manifold to which the sensor is otherwise received, the snubber block contains fuel passages with respective flow restrictive orifices; and
   the sensor mounted to the snubber block along the axis, the lower flange of the snubber block body comprising a first and second aperture for a first set of bolts that are threaded into threaded apertures formed in the fuel manifold, the first and second aperture of the lower flange geometrically arranged with respect to a first and second aperture formed in the sensor flange for a second set of bolts that are threaded into threaded apertures formed in the upper flange of the snubber block, and
   the sensor comprising a male section geometrically equivalent in shape to the male section of the snubber block, the male section of the sensor received at the upper flange within the snubber block body along the axis such that the flow restrictive orifices dampen pump pulse sensation to the sensor as the flow restrictive orifices restrict a respective high side and low side of a pressure gradient in a fuel flow.

5. The manifold assembly as recited in claim 4, wherein the sensor is a Fuel Filter Delta Pressure Sensor.

6. The manifold assembly as recited in claim 4, further comprising at least one passage with a respective flow restrictive orifice in the body of the snubber block.

7. The manifold assembly as recited in claim 6, wherein the at least one passage is in communication with a fuel filter.

8. The manifold assembly as recited in claim 7, wherein the fuel filter is mounted to the fuel manifold.

9. The manifold assembly as recited in claim 4, further comprising a first and a second flow passage in the body of the snubber block with a respective flow restrictive orifice in each of the first and second passage, the first and second passage in communication with a fuel filter.

10. The manifold assembly as recited in claim 4, wherein an interface to mount the snubber block to the fuel manifold is geometrically equivalent to an interface to mount the sensor to the snubber block.

11. The manifold assembly as recited in claim 4, wherein the snubber block is manufactured of aluminum.

12. The manifold assembly as recited in claim 4, further comprising a radial seal located on the male section of the snubber block and an axial pinch seal is mounted to the body around the male section of the snubber block to seal with a surface of the fuel manifold when the snubber block is fastened to the fuel manifold.

13. The manifold assembly as recited in claim 4, wherein the first and second aperture in the snubber block body are each coaxial with the respective first and second aperture in the sensor and the threaded apertures in the fuel manifold.

14. A method of assembling a sensor to a gas turbine engine comprising:
   mounting a snubber block between a component of the gas turbine engine and a sensor, the component being a fuel manifold;
   the snubber block comprising a male section that extends from a snubber block body along an axis, an outer surface of a lower flange of the snubber block body directly contacts an outer surface of the fuel manifold, and an upper flange of the snubber block body directly contacts a sensor flange of the sensor, the male section of the snubber block received within the fuel manifold to which the sensor is otherwise received, the snubber block contains fuel passages with respective flow restrictive orifices;

the sensor mounted to the snubber block along the axis, the lower flange of the snubber block body comprising a first and second aperture for a first set of bolts that are threaded into threaded apertures formed in the fuel manifold, the first and second aperture of the lower flange geometrically arranged with respect to a first and second aperture formed in the sensor flange for a second set of bolts that are threaded into threaded apertures formed in the upper flange of the snubber block; and the sensor comprising a male section geometrically equivalent in shape to the male section of the snubber block, the male section of the sensor received at the upper flange within the snubber block body along the axis such that the flow restrictive orifices dampen pump pulse sensation to the sensor as the flow restrictive orifices restrict a respective high side and low side of a pressure gradient in a fuel flow.

15. The method as recited in claim 14, wherein the snubber block restricts a fuel flow to and from the sensor.

16. The method as recited in claim 14, wherein the snubber block restricts a fuel flow to and from the sensor and a fuel filter.

17. The method as recited in claim 14, wherein an interface between the snubber block and the component of the gas turbine engine is geometrically equivalent to an interface between the snubber block and the sensor.

* * * * *